106. COMPOSITIONS, COATING OR PLASTIC.

Patented Apr. 19, 1932                                                    1,854,701

UNITED STATES PATENT OFFICE

IRVING F. LAUCKS AND GLENN DAVIDSON, OF SEATTLE, WASHINGTON, ASSIGNORS TO I. F. LAUCKS, INCORPORATED, OF SEATTLE, WASHINGTON, A CORPORATION OF WASHINGTON

VEGETABLE GLUE

No Drawing. Original application filed October 29, 1923, Serial No. 671,381. Patent No. 1,689,732. Divided and this application filed September 10, 1928. Serial No. 305,134.

The art of making a water-proof glue from certain protein materials has been known for some time; thus casein and blood albumin are in common use. These last mentioned compounds, however, have a number of disadvantages from a practical standpoint. Casein is costly and lack of uniformity in the material as derived from various sources is a serious detriment; while blood albumin is not available except in certain situations. There is accordingly a great demand, particularly in the veneer industry where large quantities of glue are consumed, for a new glue that will be cheap and at the same time sufficiently water-proof.

By water-proof, in this connection, it is not meant that glues thus characterized will resist the action of water indefinitely, but it is meant that they are water-proof in the sense in which the term is used in the veneer industry, viz., that a panel can be soaked in cold water for from seventy-two to one hundred hours, or in boiling water for eight hours, without separation.

Vegetable compounds have not, so far as we are aware, been heretofore satisfactorily employed as a basis for water-proof glues of the type in question. It is true that some veneer makers, on account of the high price of casein, have come to use starch glues but these, at least as heretofore made, are not at all water-proof, and vegetable proteins have not heretofore been used at all, so far as we are aware.

We have now discovered, however, that by subjecting the same to proper treatment, such vegetable proteins or vegetable matter containing proteins in proper amount, and even in the presence of starch, can be converted into a water-proof glue that will satisfy the rigid requirements of veneer making.

The requisite raw material may be derived from a number of sources and the treatment of such material is relatively simple and inexpensive so that as a result we are able to produce a satisfactory glue at a much lower cost than has heretofore been possible.

To the accomplishment of the foregoing and related ends, the invention, then, consists of the combination of ingredients or composition of matter and the steps involved in the preparation of such composition hereinafter fully described and particularly pointed out in the claims, it being understood that such disclosed ingredients and steps constitute but several of the various ways in which the principle of the invention may be used.

We have found that soya bean flour constitutes an admirable raw material for our purpose. Such flour is preferably made by grinding soya bean cake so that 80 per cent. will pass a 100 mesh screen and when treated with certain chemicals, or other substances, we make therefrom a very satisfactory glue that meets the requirements of the veneer trade fully and is in many respects better than the usual glues now on the market. Such bean cake, as analyzed by us, is found to contain on the average 45 per cent. protein, 12 per cent. water, 5 per cent. cellulose or crude fiber, 7 per cent. oil, 6 per cent. ash, and 25 per cent. carbohydrates.

We do not, however, wish to limit ourselves to soya bean flour or to vegetable protein derived from this source for we have made satisfactory glue by our improved process from similar seed flours, or protein matter derived from such, in which there is a considerable protein content, examples of which are linseed flour, cottonseed flour, and the like, or even for some uses a low grade wheat containing approximately 10% protein; that is, soya bean flour gives the best results, but other sources of vegetable protein-containing material may be employed with proportionately advantageous results.

Soya bean flour made from soya bean cake from which the oil has been expressed, is preferably used in practice because it is cheaper and makes a better glue, but flour made from whole soya beans, without expressing the contained oil, may also be used, although obviously this would not be economical in view of the value which attaches to such oil. As to the fineness of the flour, it is not necessary that the meal be ground as fine as indicated above, but fineness is desirable from a practical standpoint. It is accordingly not necessary to resort to expensive preliminary purifications and separations in order to get good results, with our process.

When the usual chemicals employed in making casein glue, viz., lime and sodium silicate, are added to a vegetable protein-containing material, for example, soya bean flour, a glue results, but it is not as good as casein glue. It is not as highly water resistant nor as workable. We find, however, by the use of caustic soda with such vegetable protein-containing matter, a much better glue is obtained, such caustic soda apparently playing the part of dispersing the colloidal material. The resultant glue is then somewhat similar in its working properties to casein glue, although its water resistance is still slightly less.

Preferably we react on our vegetable protein-containing material with both caustic soda and lime. As equivalents of such caustic soda, caustic potash and ammonia may be used, although more expensive. Other equivalents of caustic soda are salts of soda (or potash) with weak acids, e. g. sodium phosphate, sodium borate and the like. Similarly in place of lime, magnesia, baryta and strontia may be used as equivalents.

In order to improve the working properties, e. g. the spreading and flow, of the glue produced as aforesaid as well as the water resisting properties, we have found it desirable to add other substances of which the following are examples:—

Quebracho, sumach, spruce extract (concentrated sulphite liquor). These are all commonly used tanning agents. Equivalents would be other vegetable tanning agents.

Zinc sulphate, zinc chloride, ammonium zincate. Equivalents would be other zinc compounds.

Cresylic acid. Equivalents would be other phenols.

Sodium silicate, or other soluble silicates.

Rosin, sodium or calcium soaps of rosin. Equivalents would be other resin or resin combinations with metals.

In general, the tanning agents, a cresylic acid and phenols increase the water resistance of the glue; the silicates and related compounds act as thinners while at the same time increasing the water resistance and the strength of the glue; and that rosin and derivatives thereof act as thinners and make the glue more readily workable. Substances such as the foregoing, which act as a thinner, or render the glue more readily workable, may be appropriately referred to as spreaders.

We have also found that certain substances will act in the same way as the caustic soda and also as thinners, e. g. sodium phosphate, sodium perborate and sodium sulphite. These salts are all related in that they are combinations of the strong base sodium with a weak acid and there are a number of other salts that fall in the same category and which have a similar effect, so need not be listed in detail.

(1) Mix 30 parts soya bean flour, 5 parts rosin, 1½ parts copper sulphate, 1 part quebracho together dry; add 90 parts water and 26 parts 18 per cent. caustic soda solution; stir well; add 6 parts calcium hydrate in 15 parts water; then add 15 parts water glass, giving finished glue.

(2) Mix 30 parts soya bean flour, 5 parts rosin, 1½ parts copper sulphate, ½ part sodium dichromate, 90 parts water, 1 part cresylic acid, 26 parts 18 per cent. caustic soda solution, 6 parts calcium hydrate in 15 parts water, 15 parts water glass.

(3) Mix 30 parts cottonseed flour, 5 parts rosin, 3 parts quebracho together dry; add 80 parts water and 26 parts 18 per cent. caustic soda solution; stir well; add 6 parts calcium hydrate and 15 parts water; then add 15 parts water glass, giving finished glue.

The particular order in which the several ingredients are admixed together in the formulæ just given may be varied, and it is not necessary that the manufacture of the product be completed in a single continuous operation, but as a matter of practice we have found it desirable in certain cases to mix only certain of the ingredients initially and then add the others just before the glue is required for use.

This application is a division of our application, Serial No. 671,381, filed Oct. 29, 1923 (Patent No. 1,689,732).

Other modes of applying the principle of our invention may be employed instead of the one explained, change being made as regards the process herein disclosed or the materials employed in carrying out such process provided the stated ingredients and steps or the equivalent of such stated ingredients or steps be employed.

We therefore particularly point out and distinctly claim as our invention:—

1. An adhesive composition, which comprises the reaction products of a vegetable seed flour, an alkaline medium, and an organic tanning agent.

2. An adhesive composition, which comprises the reaction products of an oil-seed flour, an alkaline medium, and an organic tanning agent.

3. An adhesive composition, which comprises the reaction products of soya-bean flour, an alkaline medium, and an organic tanning agent.

4. An adhesive composition, which comprises the reaction products of soya bean protein-containing material, an alkaline medium and a tannin-containing agent.

5. An adhesive composition, which comprises the reaction products of a vegetbale proteinous material, an alkaline medium and quebracho.

6. An adhesive composition, which comprises the reaction products of soya bean protein-containing material, an alkaline medium and quebracho.

7. An adhesive composition, which comprises the reaction products of a vegetable proteinous material, an alkaline medium, a spreader and a tannin-containing agent.

8. An adhesive composition, which comprises the reaction products of soya bean protein-containing material, an alkaline medium, a spreader and a tannin-containing agent.

9. An adhesive composition, which comprises the reaction products of a vegetable proteinous material, an alkaline medium, rosin and a tannin-containing agent.

10. An adhesive composition, which comprises the reaction products of soya bean protein, an alkaline medium, rosin and a tannin-containing agent.

11. An adhesive composition, which comprises the reaction products of a vegetable proteinous material, an alkaline medium, a tannin-containing material, a soluble silicate, and rosin.

12. An adhesive composition, which comprises the reaction products of soya bean flour, an alkaline medium, quebracho, and rosin, the proportions of the soya bean flour, the quebracho, and the rosin being about 30 parts of the soya bean flour, about 1 part of quebracho, and about 5 parts of the rosin respectively.

IRVING F. LAUCKS.
GLENN DAVIDSON.